(12) United States Patent
Fayollas et al.

(10) Patent No.: US 8,876,424 B2
(45) Date of Patent: Nov. 4, 2014

(54) MAINTENANCE-FREE LINEAR ANNULAR CONNECTION AND DEVICE INCLUDING AT LEAST SUCH A CONNECTION

(75) Inventors: Philippe Fayollas, Bouscat (FR); Francois Macias, Mios (FR)

(73) Assignee: Commissariat a l'Energie Atomique, Paris (FR)

( * ) Notice: Subject to any disclaimer, the term of this patent is extended or adjusted under 35 U.S.C. 154(b) by 420 days.

(21) Appl. No.: 12/516,188

(22) PCT Filed: Dec. 5, 2007

(86) PCT No.: PCT/EP2007/063364
§ 371 (c)(1),
(2), (4) Date: May 22, 2009

(87) PCT Pub. No.: WO2008/068287
PCT Pub. Date: Jun. 12, 2008

(65) Prior Publication Data
US 2010/0067979 A1     Mar. 18, 2010

(30) Foreign Application Priority Data
Dec. 7, 2006   (FR) ...................................... 06 55373

(51) Int. Cl.
*F16F 1/38*      (2006.01)
*F16C 11/12*    (2006.01)
*G02B 7/00*     (2006.01)

(52) U.S. Cl.
CPC ................ *F16C 11/12* (2013.01); *G02B 7/003* (2013.01)
USPC ............................ 403/203; 403/220; 403/225

(58) Field of Classification Search
USPC ........ 248/222.11, 222.12; 403/203, 220, 357, 403/DIG. 14, 291, 166, 179, 255; 464/86, 464/97
See application file for complete search history.

(56) References Cited

U.S. PATENT DOCUMENTS

| | | | | |
|---|---|---|---|---|
| 3,820,815 A | * | 6/1974 | Noir | 403/206 |
| 4,775,815 A | * | 10/1988 | Heinz | 310/328 |
| 4,917,484 A | * | 4/1990 | Heinz | 359/224.1 |
| 4,941,740 A | * | 7/1990 | Sigman | 359/223.1 |

(Continued)

FOREIGN PATENT DOCUMENTS

| | | |
|---|---|---|
| WO | 85/05464 A | 12/1985 |
| WO | 03/087944 A2 | 10/2003 |

OTHER PUBLICATIONS

French Search Report in French Application No. FR 0655373, dated Jun. 28, 2007.

(Continued)

*Primary Examiner* — Daniel P Stodola
*Assistant Examiner* — Matthew R McMahon
(74) *Attorney, Agent, or Firm* — Nixon & Peabody LLP

(57) ABSTRACT

A connection intended to connect together a first and a second element, capable of allowing small movements between the first and second elements, said connection being formed by at least one material capable of being deformed elastically, said connection including a central portion of small transverse dimension, capable of deforming elastically in flexure and in torsion and first and second end portions attached to longitudinal ends of said central portion, at least the first end portion being capable of deforming elastically in a longitudinal direction connecting the longitudinal ends of the central portion, said connection forming an angular linear connection.

8 Claims, 6 Drawing Sheets

(56) References Cited

U.S. PATENT DOCUMENTS

Figure 1:
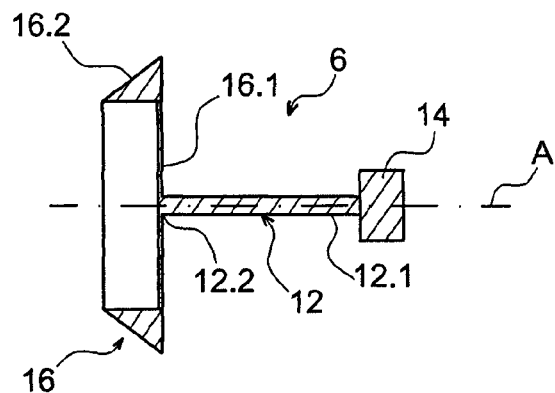

| | | | | |
|---|---|---|---|---|
| 5,016,072 A | * | 5/1991 | Greiff | 257/418 |
| 5,016,970 A | * | 5/1991 | Nagase et al. | 385/60 |
| 5,110,195 A | | 5/1992 | Loney | |
| 5,213,436 A | * | 5/1993 | Fichtner et al. | 403/291 |
| 5,369,988 A | * | 12/1994 | Selby | 73/54.28 |
| 5,550,669 A | * | 8/1996 | Patel | 359/224.1 |
| 5,797,234 A | * | 8/1998 | Theodorou | 52/578 |
| 6,092,823 A | * | 7/2000 | Busby | 280/284 |
| 6,328,047 B1 | * | 12/2001 | Lee | 135/20.1 |
| 6,722,808 B1 | * | 4/2004 | Franz et al. | 403/291 |
| 7,092,141 B2 | * | 8/2006 | Kim et al. | 359/290 |
| 2005/0030604 A1 | | 2/2005 | Moore | |

OTHER PUBLICATIONS

International Search Report and Written Opinion in International Application No. PCT/EP2007/063364, mailed Feb. 28, 2008.

* cited by examiner

MAINTENANCE-FREE LINEAR ANNULAR CONNECTION AND DEVICE INCLUDING AT LEAST SUCH A CONNECTION

CROSS REFERENCE TO RELATED APPLICATIONS OR PRIORITY CLAIM

This application is a national phase of International Application No. PCT/EP2007/063364, entitled "MAINTENANCE-FREE LINEAR ANNULAR CONNECTION AND DEVICE COMPRISING AT LEAST ONE SUCH CONNECTION", which was filed on Dec. 5, 2007, and which claims priority of French Patent Application No. 06 55373, filed Dec. 7, 2006.

DESCRIPTION

Technical Field and Prior Art

The present invention relates to a maintenance-free annular type connection and to devices including at least such a connection, for example optical devices requiring accurate adjustments.

In the state of the art, it is often required to be able to adjust the position of a component relatively to a support, the component being attached to the support through several connections. For this, the connections should provide several degrees of freedom in rotation and/or in translation. For this purpose, ball-joint connections are traditionally used, associated with other connections providing other degrees of freedom in order to ensure pure movement such as for example a rotation.

The ball or spherical joint connection ensures a connection between two elements allowing rotation around three axes of one of the elements relatively to the other. Most often, the ball joint connection includes a male sphere and a female seat with or without play, but also bearings for small displacements. These ball joints operate by sliding or by rolling, by interposing balls between the male element and the female element of the connection. This connection is very efficient, however it requires maintenance, notably greasing because of the more or less significant friction depending on the load applied to the connection, or for avoiding seizing-up of the bearings (ball bearings for example). Further in order to achieve a ball joint connection without any play, it is necessary to apply forces on the parts (male spherical head and female spherical seat) by spring systems, and by applying pre-stresses on the balls for the ball joints. In every case, inevitable and poorly controlled wear occurs which requires regular maintenance. Moreover, if the connection is not actuated for a long period, the latter incurs risks of seizing up, by burring or by lack of lubrication.

Consequently, ball joint connections from the state of the art have a relatively complex structure, require particularly careful manufacturing, since an adjustment between the different elements is required, and they therefore have a high manufacturing cost. Moreover, they require regular maintenance, in order to ensure their durability over time. Finally, these connections are sensitive to external elements.

Moreover, when it is desired to make an annular linear connection, i.e. a connection with three axes of rotation and one axis of translation, it is necessary to add to the ball joint connection as described earlier, another mechanical connection for ensuring translation. A connection is then obtained for which manufacturing is even more complex, with significant bulkiness and combining the drawbacks of each of the connections.

Further, in the case of an optical device including a support, an optical component (and actuators with which the angular position of the component may be adjusted relatively to the support), it is sought during an angular adjustment achieved via actuators, that the optical component does not deform by more than a few tenths of microns. For this, it is necessary that the ball joint connections do not generate any significant resistant torque on the support, which would transmit the deformation onto the optical component.

In order to minimize this force transmission, a solution would be to use perfect ball joints, i.e. frictionless ball joints with a support which would maintain the optical component in any way and with interfaces absorbing the deformations due to the linear displacements of the actuators, because in this case, the motors have limited axial, radial and transverse loading capacity. This therefore assumes that almost perfect ball joints are available, the friction of which is very reduced or including very accurate bearings. This type of ball joint in addition to its significant cost is very sensitive to wear and requires maintenance.

Therefore an object of the present invention is to provide an annular linear connection of simple design for movements of relatively small amplitude, without any maintenance and with a price cost less than that of the connections of the state of the art.

DISCUSSION OF THE INVENTION

The previously stated object is achieved by a connection including a rod capable of deforming in order to provide three degrees of freedom in rotation, and a base substantially perpendicular to the rod, the deformation of which in the direction of the axis of the rod provides a degree of freedom in translation.

In other words, a connection is achieved, all the elements of which are fixed relatively to each other and the deformation of the materials is used in order to obtain the required movements of rotation and translation. As the connection is intended to allow movements of small amplitude, it is possible to use the deformability of the material for achieving these movements, without risking deterioration of the connection, the movements not being of very much stress on the connection per se. For this, the materials used for making the connection provide high yield strength.

In the case of an optical device, maintaining the optical component in its support is made isostatic for example by supports on three points and imperfect connections are used which are deformable for small displacements, which may possibly transmit a parasitic torque which is not a nuisance for the adjustment.

In a particular exemplary embodiment, the base includes a thinned central area on which the rod is attached, this area being then able to deform elastically along the axis of the rod because of its small thickness.

The object of the present invention is then mainly a connection intended to connect a first and a second element, capable of allowing small displacements between the first and second elements, said connection being formed by at least one material capable of deforming elastically, said connection including a central portion of small transverse dimension capable of deforming elastically in flexure and in torsion and first and second end portions attached to longitudinal ends of said central portion, at least the first end portion being capable of deforming elastically in a longitudinal direction connecting the longitudinal ends of the central portion, said connection forming an annular linear joint.

In an advantageous exemplary embodiment, the central portion is a rod and the first end portion forming a base includes a central area thinned relatively to a peripheral area, the rod being attached in this thinned area.

The peripheral area is advantageously of a frusto-conical shape, the largest base of which is oriented on the side of the rod, the peripheral area forming a crown around the thinned area, with which it is possible to obtain a very good hold of the connection with a reduced tightening force.

The connection according to the present invention may include a rigid sleeve mounted with play around the central portion.

The central portion may for example be made in piano wire and be attached to the first and second end portions, for example by welding, in particular by brazing.

The connection is for example made in steel, for example spring steel, notably in 45SCD6 steel.

The material(s) making up the connection according to the present invention preferably has (have) yield strength above 1120-1400 MPa.

The object of the present invention is also a device including a support and a component attached to the support and capable of being moved relatively to said support, said component being attached to said support through at least one connection according to the invention, said connection being fitted through one end into the support and at another end into the component.

The component may advantageously be attached to the support through connections according to the invention, with which a relatively rigid hold may be obtained, while providing some flexibility.

The component may also be attached to the support through at least one connection according to the invention and at least one connection formed by a rod fitted at one end into the support and at one end into the component.

Advantageously, the device according to the invention includes at least one actuator positioned between one end of a connection and the support, said actuator being intended to move said end of the connection relatively to the support.

In an exemplary embodiment, the component is of a rectangular shape, two connections being attached to a first side of the component and one connection being attached on a second side opposite to the first side; with this triangular distribution, it is possible to obtain an isostatic and rigid attachment of the component on the support, reducing the sensitivity of the device to external vibrations.

Both connections on the same side may be mounted on actuators in order to allow adjustment in position of the component relatively to the support.

The actuators are of the linear type for example.

For example, the first end portion is attached onto the component or onto the support by tightening said first end portion by means of a nut in a bore of the component or of the support and the other end portion is attached by screwing into a bore of the support or the component.

The bore receiving the first end portion advantageously includes a bottom with a frusto-conical shape corresponding to that of the first end portion of the connection according to an exemplary embodiment of the invention, with which secure immobilization may be obtained with a reduced tightening force. Moreover, cooperation of these shapes provides facilitated self-centering.

The component is an optical component for example.

The object of the present invention is also a method for manufacturing a device according to the present invention, including the steps of:

a) attaching at least one connection onto the component,
b) attaching the connection onto the support.

During step b), at least one actuator is attached on the support between the connection and the support.

The component may include a mount and an element mounted in the mount, in this case, the method according to the present invention provides during step a), that the connections are attached on the mount of the element in the absence of the element, the element being mounted in the mount after attachment of the connections on the support.

The component may then be put in a horizontal position, and then tilted in the position of use; the element is then clamped on the mount.

SHORT DESCRIPTION OF THE DRAWINGS

Figure 2A:
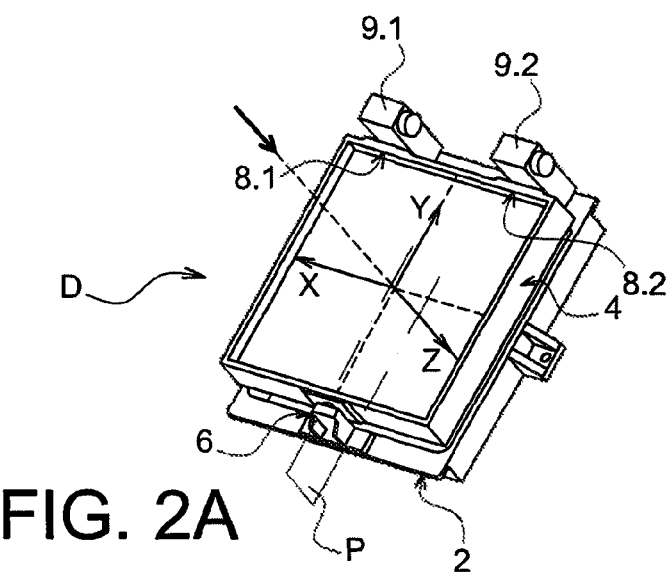
Figure 2B:
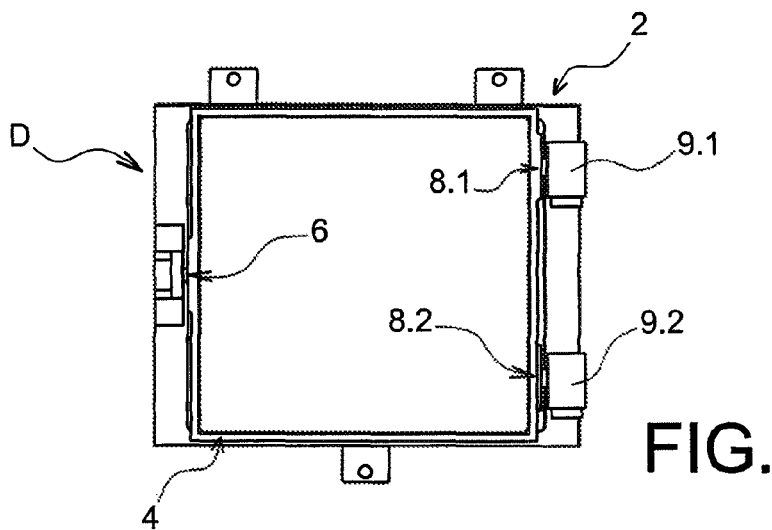
Figure 2C:
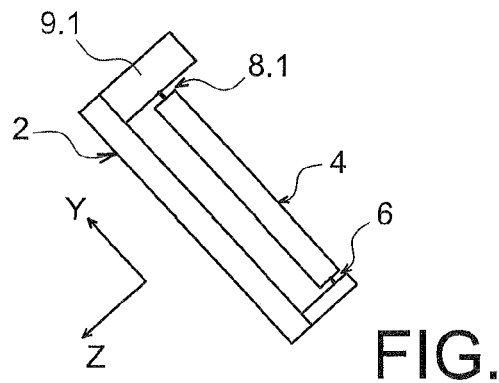
Figure 3:
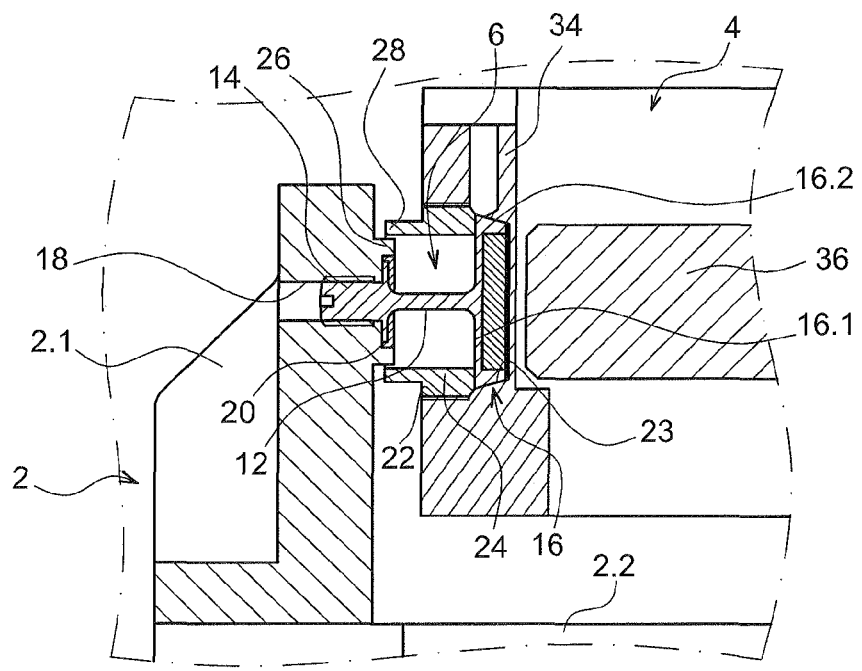
Figure 4:
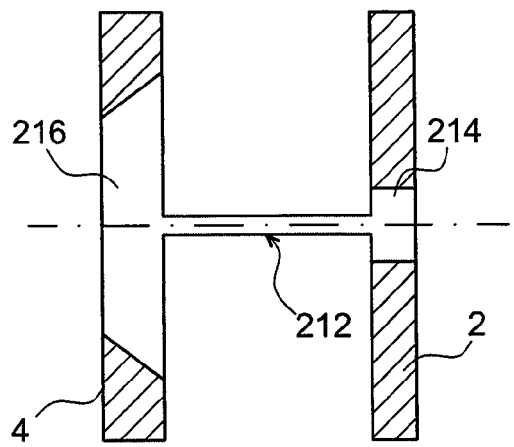
Figure 5A:
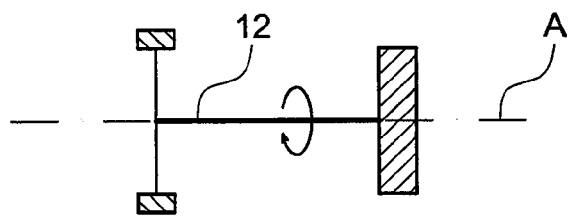
Figure 5B:
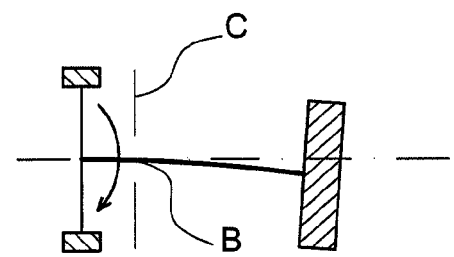
Figure 5C:
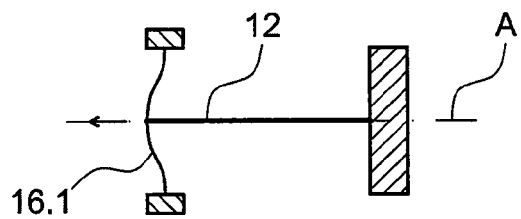
Figure 6:
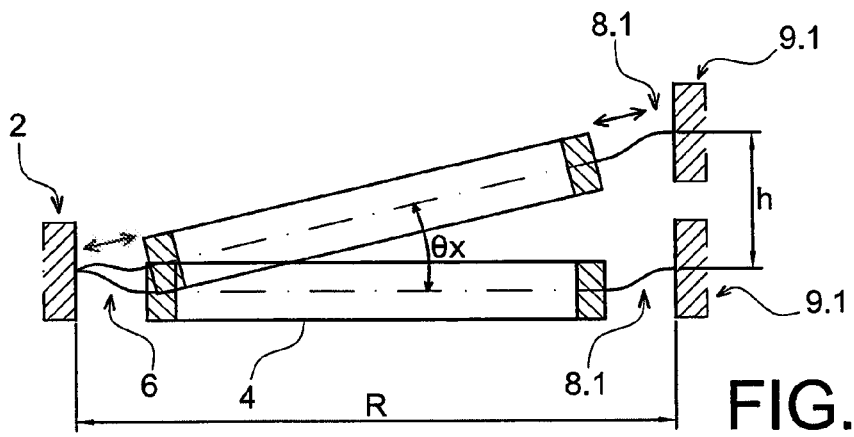
Figure 7:
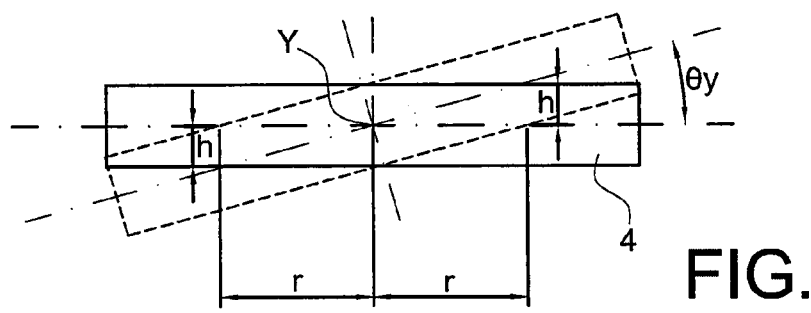
Figure 8:
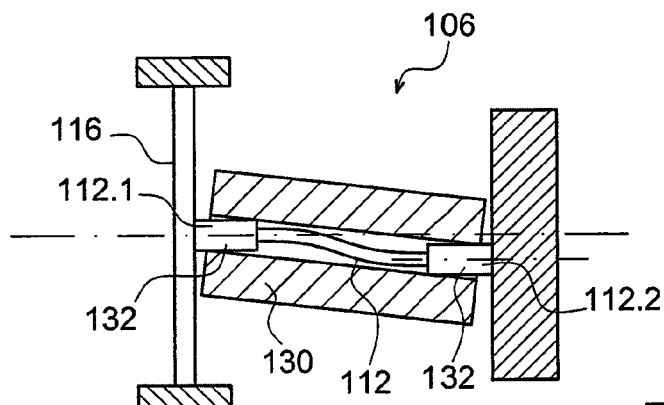
Figure 11A:
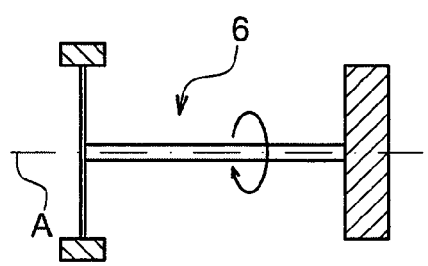
Figure 11B:
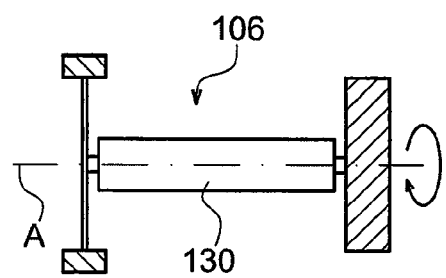
Figure 12A:
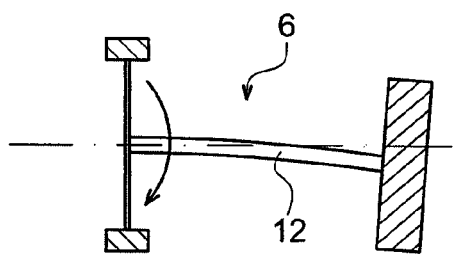
Figure 12B:
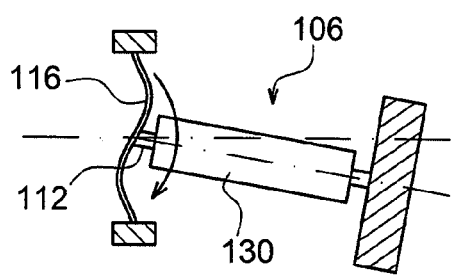
Figure 13:
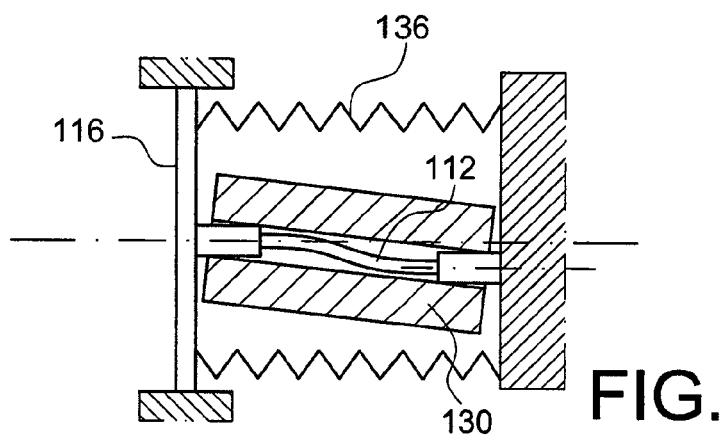
Figure 14:
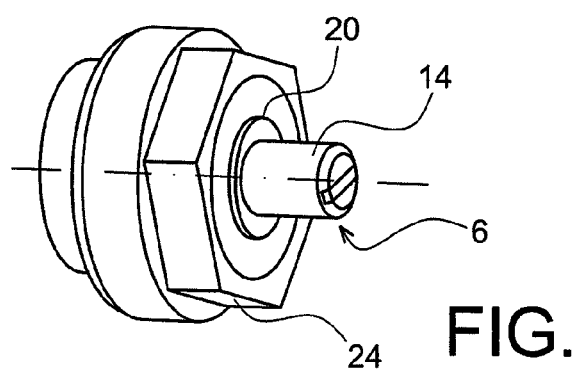

The present invention will be better understood with the help of the description which follows and the appended drawings, wherein:

FIG. 1 is a schematic longitudinal sectional view of a first embodiment of a connection according to the present invention, FIG. 2A is a three quarter perspective view of an optical device applying the connection of FIG. 1, FIG. 2B is a top view of the device of FIG. 2A, FIG. 2C is a schematic side view of the device of FIG. 2A, FIG. 3 is a detail of a sectional view of the optical device of FIG. 2A along the axis of the connection according to the present invention, the device being illustrated tilted relatively to the vertical direction, FIG. 4 is a schematic longitudinal sectional view of another embodiment of a connection with three degrees of freedom, FIGS. 5A-5C are schematic illustrations of the movements which may be performed by the connection according to the present invention, FIG. 6 is a schematic illustration of the device of FIG. 2A, the component being in a first position, FIG. 7 is a schematic illustration of the device of FIG. 2A, the component being in a second position, FIG. 8 is a longitudinal sectional view of a second exemplary embodiment of a connection according to the present invention, FIGS. 9A, 10A, 11A and 12A are views of the connection of FIG. 1 in different states of deformation and FIGS. 9B, 10B, 11B and 12B are views of the connection of FIG. 8 in the same state of deformation, FIG. 13 is a schematic sectional illustration of an alternative connection of FIG. 8, FIG. 14 is a perspective view of a detail of the device of the figure in FIG. 2A.

DETAILED DISCUSSION OF PARTICULAR EMBODIMENTS

In the description which follows, we shall describe the connection in relationship with an optical device, but the present invention may be applied to any type of the device requiring movements of small amplitudes; examples of such devices will be given later on.

In FIG. 2A, an optical device D may be seen capable of applying at least one connection according to the present invention.

The device D includes a support 2 intended to form a reference base and at least one optical component 4. In the illustrated example, the support 2 has the shape of a frame and only one optical component 4 is provided; the latter has substantially the shape of a plate.

The component 4 is suspended from the frame by means of three connections 6, 8.1, 8.2, two so-called active connections

8.1, 8.2 each attached through one end to an actuator 9.1, 9.2 firmly attached to the support 2, the actuators 9.1, 9.2 being capable of applying a displacement along axes of rotations X and Y to the component 4, and a so-called passive connection 6 which exclusively ensures the hold of the component 4.

The actuators for example are of the stepping motor type, with a resolution of the order of 0.5 μm as an example.

In the illustrated example, the three connections 6, 8.1, 8.2 are of the type according to the present invention. However it is conceivable to provide that only one or two of the three connections 6, 8.1, 8.2 are of a known type, such as a conventional ball joint connection if necessary associated with a slide joint.

In FIG. 1, a first embodiment of a connection 6 according to the present invention may be seen. We shall describe in detail the connection 6, a so-called passive connection, but the description applies to other so-called active connections 8.1, 8.2.

The connection 6 includes a rod 12 with a longitudinal axis A, a head 14 attached at the first end 12.1 of the rod 12 and a base 16 attached to a second end 12.2 of the rod 12.

The head is intended to be integral with the support 2 or the component 4 as regards rotation and translation, and the base is intended to be attached in translation and in rotation to the component 4 or to the support 2.

The rod 12 has a substantially smaller diameter than that of the head 14 and of the base 16, allowing it to deform elastically by torsion around its axis A, particularly visible in FIG. 5A, and by flexure around axes B and C. Deformation by flexure of the connection 6 around the axis B may be seen in FIG. 5B.

Thanks to the elastic deformation possibilities of the rod, the connection 6 includes three degrees of freedom in rotation around axes A, B and C.

The connection 6 according to the present invention also provides a degree of freedom in translation along the axis A, for this, provision is made for the possibility of deformation of the base.

Provision is then made for the base 16 to have substantially the shape of a disc, the central area of which 16.1 is capable of deforming elastically along the axis A, in order to allow the rod 12 to move along the axis A.

In the illustrated example, the base 16 includes a central area 16.1 thinned along the axis A, capable of preferentially deforming along the direction of the axis A and a peripheral area 16.2 capable of facilitating the mounting of the base on the support 2 or the component 6. This deformation is schematized in FIG. 5C.

The peripheral area 16.2 has the shape of a crown with a larger thickness than that of the thinned area 16.1.

The central area 16.1 when it is deformed has a substantially parabolic shape.

By the present invention, an annular linear connection is achieved, for which the degrees of freedom in rotation and in translation are obtained by elastic deformation of the material(s) making up the connection 6.

In the illustrated example, translation along the axis A is provided by means of a thinned area. Provision may also be made for making the base elastically deformable, by making radial lumens in the base, these lumens being centered on the rod so as to reduce the resistance to deformation of the base.

In the illustrated example, the crown 16.2 protrudes relatively to the thinned area 16.1 on the side opposite to the one on which the rod 12 is attached. Provision may be made so that it protrudes on the same side as the one on which the rod is attached.

In FIGS. 5A-5C, theoretical pure movements are illustrated; in practice, the connection will undergo a superposition of rotational, flexural and translational movements, according to the adjustment imposed by the actuators.

The thinned area 16.1 because of its deformation is also involved in the flexure of the connection and allows the rod 12 to be less stressed.

A practical embodiment of the present invention of the connection of FIG. 1 may be seen in FIG. 3.

In this example, the head 14 is attached to the support 2 and the base 16 is attached to the component 4.

The support 2 includes a post 2.1 protruding from a frame 2.2, provided with a bore 18 in which the head 14 is attached.

In the illustrated example, the head 14 includes a threading capable of cooperating with an internal thread in the bore 18.

Advantageously, the bore 18 opens out in order to facilitate tightening of the head 14 in the bore 18.

Any type of attachment of the head in the post 2.1 may be suitable, for example by adhesive bonding, welding, by set screws . . . .

A tightening abutment 20 is also advantageously provided as a washer radially protruding from the rod 12 in order to bear against the post 2.1 and to limit the tightening of the head 14 in the post 2.1.

The base 16 advantageously includes a frusto-conical shape, its peripheral portion 16.2 being delimited by a frusto-conical radial surface, the largest section of which is oriented towards the rod 12.

The component 8 includes a bore 22 provided with a bottom 23 with a frusto-conical shape corresponding to the frusto-conical shape of the base.

With the external shape of the base 16, it is possible to ensure self-centering upon mounting the connection in the component 4 on the one hand. It ensures mounting without any play on the other hand. Moreover, as the connection as illustrated is attached onto the component by means of a nut 24 screwed onto the component, the cone-on-cone contact ensures, with a small tightening force, a significant radial force avoiding any sliding between the connection and the component, and without requiring that significant stresses have to be exerted which risk deforming the component 4.

The nut is particularly visible in FIG. 14.

In the illustrated example, the post 2.1 includes a protrusion 26 forming a stopping abutment opposite to the frame 2.2 facing an external end 28 of the nut 24.

Thus, in the case of an accidental failure of the connection 6, the component 4 rests on the post 2.1, via the nut and the protrusion 26, reducing the risks of damaging of the component.

The nut mounted around the connection 6 may be seen in FIG. 3.

In the illustrated example, the connection is in a single piece, for example made by molding with rectification or by machining directly.

Provision may also be made for making composite connections associating several materials. For example, the rod 12 may be made in a piano wire and welded on a base 16 and a head 14 in different materials.

Generally the material(s) used for making the connection provide(s) high yield strength.

In the case of an optical device, the yield strength is larger than 1,120-1,400 MPa.

For example, a steel with or without a heat treatment may be used, depending on the stresses on the connection. As an example, spring steel, for example 45SCD6 steel, may be used.

Synthetic materials may also be considered depending on the application, of the polymeric types such as PVC, in this case making by molding is particularly easy.

The base may have a disc shape provided on its outer periphery with a threading cooperating with an internal threading made in the bore 22, a stopping means in order to prevent unscrewing may be for example provided, a threadlock or a set screw.

An attachment by adhesive bonding, welding or any other attachment means, may also be considered, in this case it may advantageously to provide a base with a polygonal shape cooperating with a matching shape in the bore 22 in order to simply prevent any rotation between the component and the connection.

In an exemplary embodiment of a connection for an optical device, the rod has a length of 14 mm and a diameter of 2 mm, the base 16 has a diameter of 28 mm and its central area has a thickness of 1 mm.

A device, in which the head is attached in the mobile component and the base is attached in the support, does not depart from the scope of the present invention.

It may also be provided that the head is of the same shape as the base and that it also allows deformation of the connection, along the axis of the rod.

We shall now describe in more detail the device illustrated in FIGS. 2A-2C. With the device it is possible to achieve a rotational displacement of the component 4 around two axes of rotation X and Y, orthogonal to each other and to a normal Z to the component 4.

In a particularly advantageous way, the device includes three connections 6, 8.1, 8.2 positioned as a triangle in order to ensure isostatic mounting of the component 4 on the support 2.

In the illustrated example, both active connections 8.1, 8.2 are positioned on a same side of the component symmetrically relatively to a middle plane P on this side and the passive connection 6 is positioned on the opposite side in the middle plane P.

The actuators 9.1, 9.2 are of the linear type, allowing a displacement of the end of the connection 8.1, 8.2 which is hooked on them, along the axis Z upwards or downwards.

Thus, if both actuators 9.1, 9.2 exert a force in the same direction along the axis Z on each of the connections, the component 4 will pivot around the axis X as this is illustrated in FIG. 6.

When the actuators move over a distance h in a same direction upwards, the component will then pivot around the axis X (illustrated in dotted lines) by an angle θx.

The stretching a undergone by each of the connections, illustrated in FIG. 6 is then:

$$a = R/\cos(\theta x) - R \quad (1)$$

R being the distance between the component and the support at each connection.

On the other hand, when both actuators move in opposite directions, they exert forces in opposite directions, the component 4 will pivot around the axis Y (illustrated in dotted lines) as this is illustrated in FIG. 7 where the actuators move in an opposite direction by a distance h.

The undergone flexure b is then equal to:

$$b = r/\cos(\theta y) - r \quad (2)$$

r being the distance separating each actuator from the middle plane P.

With the triangular arrangement of the connections according to the present invention thereby attached to the support and to the component, a rigid hold may be achieved. Indeed, the attachment method is of the <<fitted/fitted>> beam type, with which large stiffness may be obtained, which guarantees good stability while retaining working flexibility in flexure and in torsion. As a comparison, flexure stiffness is eight times larger than that of a connection of the <<fitted/free>> beam type.

With this stiffness, the device may be made less sensitive to external vibrations, thus vibrations of the optical component due to external vibrations are reduced.

Moreover, as the connections according to the present invention only provide a little resisting torque, the component incurs less risk of being deformed.

In FIG. 8, a second exemplary embodiment may be seen in which the connection 106 includes a rigid tube 130 positioned around the rod 112 and capable of moving longitudinally relatively to it, the rod 112 being connected to a base 116, deformable along the axis A and to a head (not shown).

In the illustrated example, end pieces 132 are attached onto the ends 112.1, 112.2 of the rod with a larger diameter than that of the rod and less than the inner diameter of the tube 130.

Thus, the tube 130 may have a sufficiently large inner diameter so as to freely slide on the rod 112, while stiffening the rod 112 because of the cooperation of the end pieces with the inner passage of the tube 130, as this is illustrated in FIG. 8.

The tube 130 recovers the static load forces of the optical component (mass of the mobile assembly) while leaving the movements free.

The movements generated by the relative movements between the tube 130 and the rod do not generate any significant resisting torque because of the very small diameter of the tube.

The tube 130 is for example made in steel or in brass, providing a low friction coefficient with the rod of the connection.

Further, as this is illustrated in FIG. 13, bellows 136 may be positioned around the tube 130 and attached to the support and to the optical component in order to isolate the connection from the external environment and avoid pollution of the optical component by particles dislodged by friction.

The connection provided with a tube and isolation bellows is particularly suitable for devices intended to be used in clean rooms, since any contamination is confined in the bellows.

Differences in behavior between both exemplary embodiments of the connection according to the present invention may be seen in FIGS. 9A-12B.

Figure 9A:
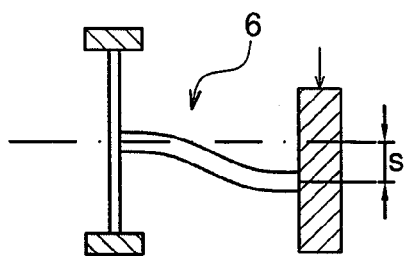
Figure 9B:
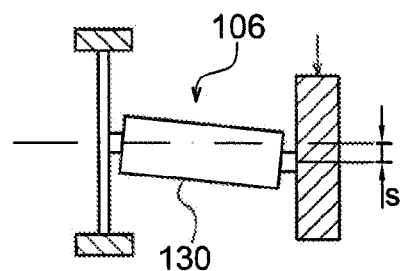

In FIGS. 9A and 9B, the connection is subject to static deflection in the case of the connection 106, the deflection distance S is reduced, comparatively with that of the connection 6.

Figure 10A:
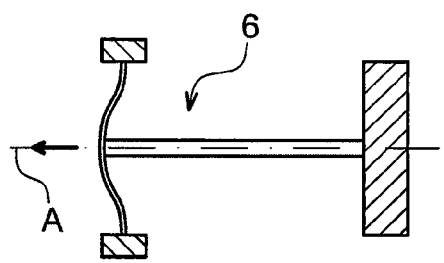
Figure 10B:
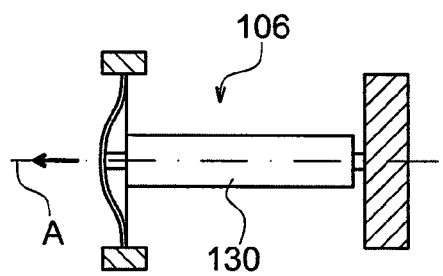

In FIGS. 10A and 10B, the connection is subject to a translation along the axis A, the connections 6 and 106 have the same behavior.

In FIGS. 11A and 11B, the connection is subject to torsion around the axis A, the connections 6 and 106 have the same behavior.

In FIGS. 12A and 12B, the connection is subject to a rotation around an axis orthogonal to the plane of the sheet. In the case of the connection 6, it is the rod 12 which bends, on the other hand in the case of the connection 106, it is the base 116 which deforms in order to allow rotation.

The tube recovers the static load of the optical component. Further, the position of the axis of rotation is shifted towards the base 116.

With the present invention, it is possible to achieve displacements of small amplitudes; the latter is particularly suitable for carrying out optical alignments, accurate adjustments.

The adjustments may be carried out by motorized means or manually.

We shall now explain the mounting of a connection according to the present invention between a support and a component.

The optical component is formed with a mount 34 and an optical element 36 mounted in the mount 34.

In certain cases, the deformations due to the static load are very large with respect to the kinematic deformations due to the strokes of the actuators (for example 4-5 times larger with a small rod diameter). Therefore, it is particularly advantageous to first mount the connections on the empty mount 34 and then to lastly mount the optical element in order to reduce these resisting torques, which may deform the optical element.

Thus the mounting method includes the steps of:
attaching the connections onto the empty mount 34,
attaching the actuators onto the support,
attaching the connections onto the support,
mounting the optics in its mount in the horizontal position,
tilting the thereby formed optical element in the position of use,
clamping the optics on its mount by means of counter-abutments.

As an example, for an optical device according to the present invention including an optical component of 15 kg, by means of the mounting described earlier, the residual resistant torque is no more than 0.06 N.m (with a rod diameter of 1.5 mm) for 0.27 N.m provided for a conventional mounting with the optical element mounted in its mount right from the start.

The connection according to the invention is of a simple shape, it is then very interesting both technically and economically.

Indeed, this deformable connection, well adapted for small displacements, provides the following advantages:
the connection is without any play, because of its capability of elastically deforming,
it does not require any maintenance, no greasing is required since it does not include any moving part,
it operates smoothly since it consists of a single part,
its mounting is easy and fast, which reduces manufacturing costs,
with the connection it is possible to stiffen the mounting of the optical component at a first mode of the order of 20-30 Hz, above the seismic excitation mode of the order of 10 Hz. For example, in the case when it is desired to achieve high accuracy alignments for a laser device, the optical component(s) do(es) not vibrate because of natural vibrations,
it is lightweight and not very bulky relatively to the ball joints of the state of the art,
its realization allows minimization of the use of materials which are prohibited in certain applications, indeed the mass of the rod is reduced, for example 0.3 g in the illustrated example, which reduces radiations. Moreover, the use of Teflon which is sometimes forbidden in certain applications, is not required in the present invention, since there are no moving parts,
manufacturing cost is very low, because of the simplicity of its making and of the possibility of mass production,
by its very simple structure, spare connections may be made for a long period, which ensures continued existence of the devices equipped with such connections,
moreover, it may easily be adapted to any device without requiring any significant modification,
it does not require any interface parts with the actuators, a single part provides the four degrees of freedom,
this connection minimizes the resisting torques or parasitic torques, which allows it to be applied in the optical field where the components are very fragile,
this connection may be used in clean rooms, since it does not generate particles because of the absence of displacement of parts relatively to each other, or in the case of the connection provided with a tube and bellows, the latter providing the confinement of the particles likely to be generated by friction,
it has a very long lifetime for small displacements,
it is insensitive to severe environments such as humid environments, salt spray, high or low temperatures, intense radiation . . . ,
it is insensitive to vacuum, it may therefore be used in vacuum vessels because it is not at the origin of degassing.

The connection according to the present invention may be applied in devices for accurate orientation adjustments of an object, with or without an actuator.

The connection may be applied to many optical fields and particularly on laser chains.

The connection may also allow optics to be aligned on laser chains which apply many adjustable optical components.

The connection according to the invention may also be used in the field of telecommunications, for adjusting antennas or miscellaneous sources, in the field of heat, for regular accurate adjustment of solar sensors or panels under severe environmental conditions.

This connection may also be used in the field of satellites, since it is insensitive to vacuum, it has a significant lifetime, does not require maintenance and is very lightweight.

It may also be used in any device requiring movements with low amplitude, for example in water sports in order to change the position of a mast.

In FIG. 4, a connection without any moving part may be seen, including three degrees of freedom in rotation obtained by the rod 212, the base 216 being rigid and not providing a degree of freedom in translation along the direction of the rod 212. The connection also includes a head 214 at its other end.

For example in the case of the optical device applying three connections, a connection forming exclusively a ball joint as described above and illustrated in FIG. 4 and two connections of FIG. 1 can be used providing an annular linear joint in order to obtain better stability of the optical component in its mount. The base 216 is attached on the component 4 and the head 214 is attached onto the support 2.

The invention claimed is:

1. A connection to connect a first and a second element, the connection comprising:
a central portion having a transverse dimension, the central portion configured to deform elastically in flexure and in torsion; and
first and second end portions attached to longitudinal ends of said central portion, a longitudinal axis extending between the longitudinal ends of said central portion, at least the first end portion configured to deform deforming elastically at least in one longitudinal direction along the longitudinal axis, wherein a transverse dimension of the first and second end portions is larger than the transverse dimension of the central portion, and wherein the first end portion comprises a central area and a peripheral area, the central area thinned relative to the peripheral area in a direction along the longitudinal axis and the central area is configured to deform elastically in the direction along the longitudinal axis;

wherein, when a load is applied to the first end portion along the longitudinal axis or to the second end portion along the longitudinal axis, the central area of the first end portion deforms such that the longitudinal end of the central portion that is attached to the central area of the first end portion moves in the direction along the longitudinal axis towards or away from the second end portion, and upon such deformation the central area forms a substantially parabolic shape, wherein the central portion is welded to the thinned central area, wherein the connection allows for small displacements between the first and second elements, wherein the connection is formed of at least one material capable of deforming elastically, and wherein the transverse dimension of the first end portion is larger than a longitudinal dimension of the central portion.

2. The connection according to claim 1, wherein the central portion is a rod, and wherein the first end portion forms a base, the base including the central area and the peripheral area, and wherein the rod is attached to the thinned central area.

3. The connection according to claim 2, wherein the peripheral area is of a frusto-conical shape, the largest base of which is oriented on the side of the rod, the peripheral area forming a crown around the thinned area.

4. The connection according to claim 1, including a rigid tube mounted around the central portion, wherein a diameter of the rigid tube is greater than a diameter of the central portion to allow a relative displacement between the tube and the central portion.

5. The connection according to claim 1, wherein the central portion is made of piano wire that is welded to the first and second end portions.

6. The connection according to claim 1, wherein the connection is made of steel.

7. The connection according to claim 1, wherein the connection is made of one or more materials, each of the one or more materials having a yield strength above 1,120 MPa.

8. A connection to connect a first and a second element, the connection comprising:

a rod having a first end and a second end, a longitudinal axis extending from the first end to the second end, the rod having a cross-sectional dimension perpendicular to the longitudinal axis;

a head attached to the first end of the rod; and a base attached to the second end of the rod comprising a central area and a peripheral area, wherein a thickness of the peripheral area is greater than a thickness of the central area in a direction along the longitudinal axis and the central area is configured to deform elastically in the direction along the longitudinal axis;

wherein, when a load is applied to the base along the longitudinal axis or to the head along the longitudinal axis, the central area of the base deforms such that the second end of the rod moves in the direction along the longitudinal axis towards or away from the head, and upon such deformation the central area forms a substantially parabolic shape, wherein the rod is welded to the central area of the base, and wherein a cross-sectional dimension of the head perpendicular to the longitudinal axis and a cross-sectional dimension of the base perpendicular to the longitudinal axis are larger than the cross-sectional dimension of the rod, and wherein the cross-sectional dimension of the base is larger than a longitudinal dimension of the rod.

* * * * *